US011567882B2

(12) United States Patent
Chang et al.

(10) Patent No.: US 11,567,882 B2
(45) Date of Patent: Jan. 31, 2023

(54) METHOD AND APPARATUS FOR DELIVERING MULTIPLE COMMANDS THROUGH VIRTUAL BURST-MODE TRANSMISSION AND INITIALIZATION OF IMAGE SENSOR

(71) Applicant: Himax Imaging Limited, Tainan (TW)

(72) Inventors: Ray Chi Chang, Tainan (TW);
Chih-Yen Yang, Tainan (TW)

(73) Assignee: Himax Imaging Limited, Tainan (TW)

( * ) Notice: Subject to any disclaimer, the term of this patent is extended or adjusted under 35 U.S.C. 154(b) by 0 days.

(21) Appl. No.: 17/088,539

(22) Filed: Nov. 3, 2020

(65) Prior Publication Data

US 2022/0138121 A1    May 5, 2022

(51) Int. Cl.
*G06F 3/00*    (2006.01)
*G06F 13/16*    (2006.01)
*G06F 13/42*    (2006.01)

(52) U.S. Cl.
CPC ...... *G06F 13/1668* (2013.01); *G06F 13/4282* (2013.01); *G06F 2213/0016* (2013.01)

(58) Field of Classification Search
None
See application file for complete search history.

(56) References Cited

U.S. PATENT DOCUMENTS

| 10,643,707 B2* | 5/2020 | Rajamani | G06F 3/0679 |
| 2005/0108454 A1* | 5/2005 | Baker | G06F 13/423 |
| | | | 710/110 |
| 2014/0223090 A1* | 8/2014 | Malone | G11C 19/00 |
| | | | 711/104 |
| 2015/0286606 A1* | 10/2015 | Sengoku | G06F 13/364 |
| | | | 710/110 |
| 2019/0035473 A1* | 1/2019 | Rajamani | G06F 3/0679 |

* cited by examiner

*Primary Examiner* — Henry Tsai
*Assistant Examiner* — Dean Phan
(74) *Attorney, Agent, or Firm* — Winston Hsu

(57) ABSTRACT

A method for delivering multiple write commands is provided. The method includes: encoding data to be written and corresponding addresses in the multiple write commands to obtain encoded data and an encoded address, wherein the addresses are not sequential; generating a virtual burst write command according to the encoded data and the encoded addresses; and transmitting a virtual burst-mode start indicator and the virtual burst write command through a serial bus.

14 Claims, 5 Drawing Sheets

METHOD AND APPARATUS FOR DELIVERING MULTIPLE COMMANDS THROUGH VIRTUAL BURST-MODE TRANSMISSION AND INITIALIZATION OF IMAGE SENSOR

BACKGROUND OF THE INVENTION

1. Field of the Invention

The present invention relates generally to command transmissions on a serial interface, and more particularly, to method and apparatus for delivering multiple commands through virtual burst-mode transmission and method and apparatus for initialization of an image sensor.

2. Description of the Prior Art

Typically, an image sensor could be programmed by its internal registers through commands on a serial bus, such as, an $I^2C$ bus, where each register may store a control value to configure the image sensor in a certain aspect, such as, a resolution of a frame, an exposure time, a frame rate and so on. For an initialization process of the image sensor, a lot of default control values are required to be written to the internal registers of the image sensor, so as to allow the image sensor to operate in a default state. In order to write these default control values to the registers, a bus master device (in a host controller) needs to conduct a lot of bus transactions with a bus slave device (in the image sensor).

In a case where N bus transactions between the bus master device and the bus slave device are performed, each bus transaction requires a time period T_CMD, and between each bus transaction, the bus master device needs a time period T_SOC to prepare for a next bus transaction, it will take the time of (N*T_CMD+(N−1)*T_SOC) to finish N bus transactions, which is considerably long. In view of this, there is a need for providing an innovative method and apparatus to improve efficiency of delivering a massive amount of commands on a bus.

SUMMARY OF THE INVENTION

With this in mind, it is one object of the present invention to provide methods and apparatus to deliver multiple commands through burst-mode transmission even if these multiple commands are not sequential in their addresses. Embodiments of the present invention provide methods and apparatus that convert multiple write commands into a virtual burst write command by encoding addresses and data of original write commands. In addition, embodiments of the present invention also provide methods and apparatus that recover multiple write commands from a virtual burst write command by decoding addresses and data recorded in the virtual burst write command. Through the virtual burst write command, addresses and data could be transmitted via a bus in a more effective way. In view of above, the present invention not only reduces the time required by an initialization process of an image sensor, but also improves the efficiency of configuring any types of devices having multiple registers.

According to one embodiment, a method for delivering multiple write commands is provided. The method comprises: encoding data to be written and corresponding addresses in the multiple write commands to obtain encoded data and an encoded address, wherein the addresses are not sequential; generating a virtual burst write command according to the encoded data and the encoded addresses; and transmitting a virtual burst-mode start indicator and the virtual burst write command through a serial bus.

According to one embodiment, a command transmitter for delivering multiple write commands is provided. The command transmitter comprises: a command encoder and a bus master device. The command encoder is arranged to encode data to be written and corresponding addresses in the multiple write commands to obtain encoded data and an encoded address and generate a virtual burst write command according to the encoded data and the encoded addresses, wherein the addresses are not sequential. The bus master device is coupled to the command encoder, and arranged to transmit a virtual burst-mode start indicator and the virtual burst write command through a serial bus.

According to one embodiment, a method for handling commands received through a serial bus is provided. The method comprises: determining whether a virtual burst-mode start indicator is received through the serial bus; determining a received command received through the serial bus is a virtual burst write command after the virtual burst-mode start indicator is received; decoding an address and data in the virtual burst write command to obtain decoded data to be written and decoded addresses; and allowing the decoded data to be written to a plurality of registers identified by the decoded addresses.

According to one embodiment, a command receiver for handling commands received through a serial bus is provided. The command receiver comprises: a bus slave device, a mode checker and a command decoder. The bus slave device is arranged to receive commands through the serial bus. The mode checker is coupled to the bus slave device, and arranged to determine whether a virtual burst-mode start indicator is received through the serial bus and determine a received command received through the serial bus is a virtual burst write command after the virtual burst-mode start indicator is received. The command decoder is coupled to the bus slave device, and arranged to decode an address and data in the virtual burst write command to obtain decoded data to be written and decoded addresses; wherein the command receiver allows the decoded data to be written to a plurality of registers identified by the decoded addresses.

According to one embodiment, a method for initializing an image sensor is provided. The method comprising: encoding, at a host device, data to be written to a plurality of registers of an image sensor and addresses of the registers to obtain encoded data and an encoded address, wherein the addresses of the registers are not sequential; generating, at the host device, a virtual burst write command according to the encoded data and the encoded addresses; transmitting a virtual burst-mode start indicator and the virtual burst write command from the host device to the image sensor via a serial bus; receiving and decoding, at the image sensor, the virtual burst-mode indicator and the virtual burst write command to obtain decoded data and decoded addresses; and writing the decoded data to the plurality of registers of the image sensor identified by the decoded addresses.

According to one embodiment, an electronic device is provided. The electronic device comprises: a host device and an image sensor. The host device comprises: a command encoder and a bus master device. The command encoder is arranged to encode data to be written to a plurality of registers of an image sensor and addresses of the registers to obtain encoded data and an encoded address, wherein the addresses of the registers are not sequential and arranged to generate a virtual burst write command according to the encoded data and the encoded addresses. The bus master device is coupled to the command encoder, and arranged to transmit a virtual burst-mode start indicator and the virtual burst write command from the host device to the image sensor via a serial bus. The image sensor comprises: a bus slave device and a command decoder. The bus slave device is coupled to the serial bus, and arranged to receive the virtual burst-mode indicator and the virtual burst write command through the serial bus. The command decoder is coupled to the bus slave device, and arranged to decode the virtual burst write command to obtain decoded data and decoded addresses, wherein the plurality of registers of the image sensor identified by the decoded addresses are written according to the decoded data.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1:
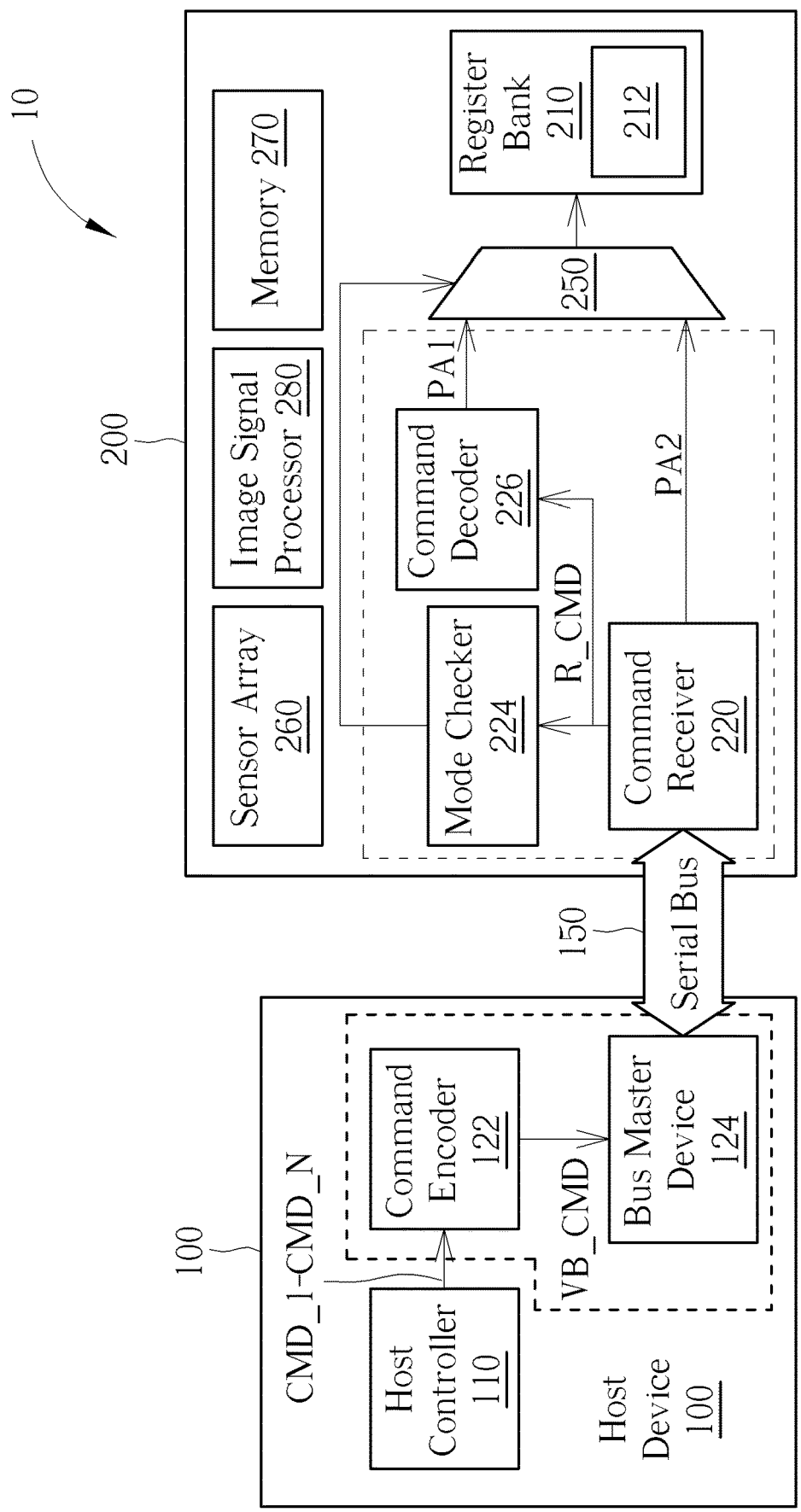
FIG. 1 illustrates a schematic diagram of an electronic device for implementation of command transmission according to one embodiment of the present invention.

Please refer to FIG. 1, which illustrates a schematic diagram of an electronic device for implementation of command transmission according to one embodiment of the present invention. As illustrated, an electronic device 10 comprises a host device 100 and a peripheral device 200. In a preferred embodiment, the peripheral device 200 could be a CCD or CMOS image sensor. According to various embodiments, the electronic device 10 could be a personal computer, a tablet computer, a laptop, a smartphone, a digital camera, or any types of devices having image capturing functions.

The host device 100 comprises a host controller 110 and a command transmitter 120. The host controller 110 could be a processor of the electronic device 10 that controls the peripheral device 200 to perform its function, such as, controls the image sensor 200 to take an image frame or an image frame sequence. The host controller 110 could execute a set of instructions or program codes to start a particular operation of the image sensor 200. In one embodiment, after executing a set of instructions or program codes, the host controller 110 could generate a set of commands CMD_1-CMD_N for instructing the image sensor 200 to start an initialization process of the image sensor 200. These commands CMD_1-CMD_N are mainly register write commands, which write default control values into a set of registers 212 in a register bank 210 of the image sensor 200. Typically, the set of registers 212 may not be sequential in their addresses. When the command transmitter 120 receives the set of commands CMD_1-CMD_N for controlling the initialization process of the image sensor 200, a command encoder 122 in the command transmitter 120 would encode addresses of the set of registers 212 and data (i.e., the default control values) to be written to the set of registers 212, resulting in an encoded address and encoded data. Accordingly, the command encoder 122 uses the encoded address as a burst write address, and uses the encoded data as burst write data, thereby to generates a virtual burst write command. A bus master device 124 in the command transmitter 120 is arranged to conduct a burst-mode transaction via a serial bus 150 between the host device 100 and the image sensor 200 based on a protocol that the serial bus 150 is compliant with. In one embodiment, the command encoder 122, the bus master device 124 and the serial bus 150 are compliant with I²C protocol, which generate the burst write command and render a burst-mode transaction based on I²C protocol. However, this is not intended to limit the present invention in scope. According to various embodiments of the present invention, the command encoder 122, the bus master device 124 and the serial bus 150 can be compliant with any types of serial bus protocols. Compared to the original register write commands CMD_1-CMD_N generated by the host controller 110, the virtual burst write command VB_CMD is much smaller in byte counts.

The following table shows an example of a set of original register write commands CMD_1-CMD_N generated by the host controller 110:

| CMD No. | Register Address | Data |
| --- | --- | --- |
| #1 | 0x3028 | 0x20 |
| #2 | 0x3029 | 0x35 |
| #3 | 0x302A | 0x83 |
| #4 | 0x302B | 0x30 |
| #5 | 0x3083 | 0x31 |
| #6 | 0x3084 | 0x20 |

After encoded by the command encoder 120, following encoded burst-mode address and encoded data will be obtained:

| CMD No. | Burst-Mode Address | Data |
| --- | --- | --- |
| #1 | 0xF000 | 0x13, 0x30, 0x28, |

| CMD No. | Burst-Mode Address | Data |
|---|---|---|
| | | 0x20, |
| | | 0x35, |
| | | 0x83, |
| | | 0x30, |
| | | 0x21, |
| | | 0x83, |
| | | 0x31, |
| | | 0x20 |

Figure 2:
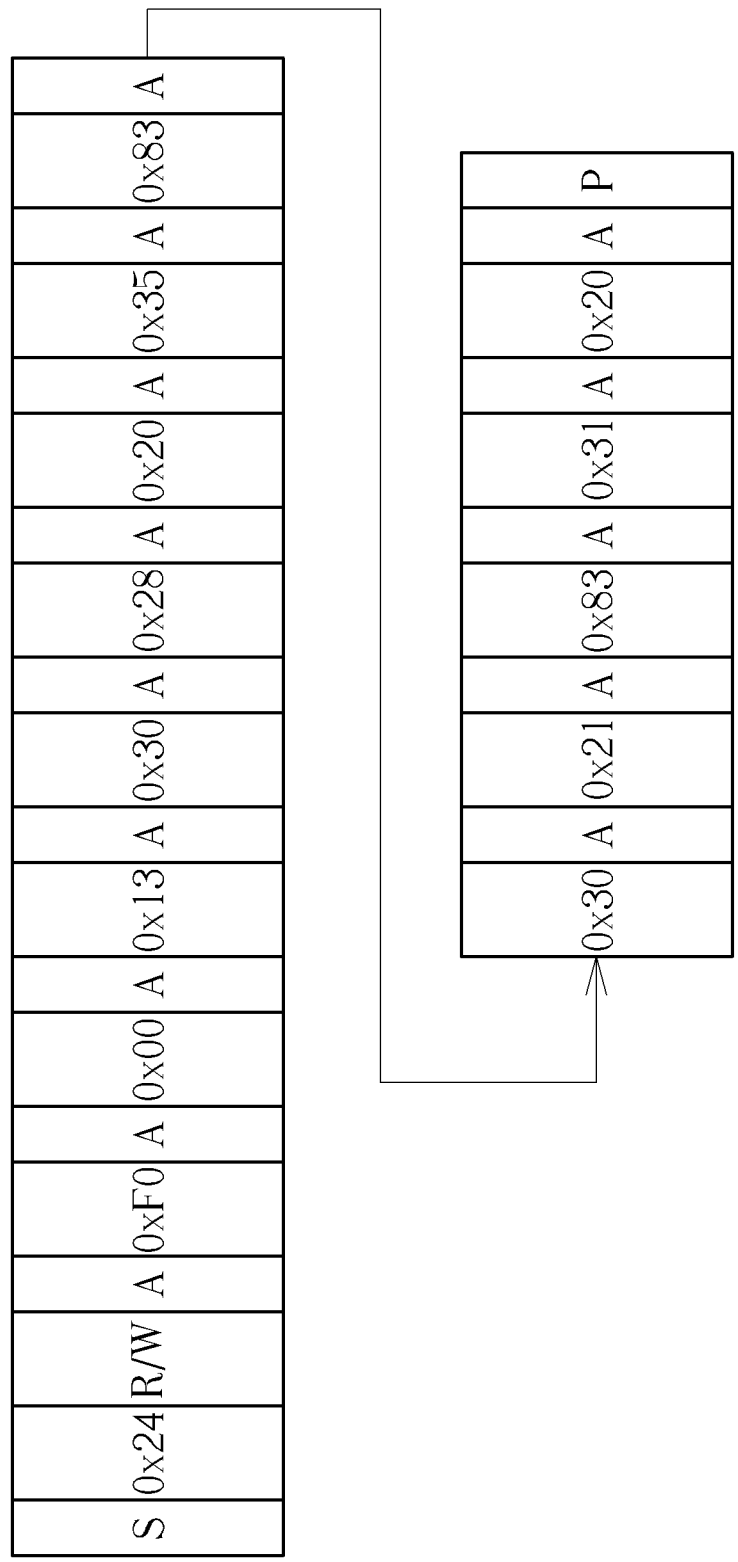
FIG. 2 illustrates a burst-mode command according to one embodiment of the present invention.

Such encoded address and data can be used to generate a burst-mode command according to any types of protocols. In the case where the I²C bus is applied, the command encoder 122 could generate a burst-mode command as shown in FIG. 2 and the bus master device 124 perform an I²C burst-mode transaction with the illustrated burst-mode command, wherein the first field with the value "S" in the burst-mode command indicates a start condition, the field with the value "0x24" in the burst-mode command indicates the salve device ID of the image sensor 200. The field "R/W" in the burst-mode command is set to 0, which signifies a write command. The fields with the value "0xF0" and "0x00" indicate addresses of the burst-mode command, where "0xF000" is the encoded address generated by the command encoder 122. The fields with the value "A" are acknowledgement bits. The fields with the value "0x13", "0x30", "0x28", "0x20", "0x35", "0x83", "0x30", "0x21", "0x83", "0x31", "0x20", are encoded data generated by the command encoder 122. The last field with the value "P" in the burst-mode command indicates a stop condition, which is an end of the burst-mode command.

As the host device 100 may still send other types of commands via the serial bus 150 rather than a virtual burst write command to the image sensor 200 for various purposes. Therefore, once the command encoder 122 generates the virtual burst write command, the command transmitter 120 could generate a virtual burst-mode start indicator and send it to the command receiver 220 in the image sensor 200 to notify the virtual burst write command will be sent later. Moreover, a virtual burst-mode end indicator will be sent to the command receiver 220 once the transmission of the virtual burst write command has been completed. According to the virtual burst-mode start and end indicators, the command receiver 220 could determines whether a received command is the virtual burst write command and when the virtual burst write command will be transmitted.

Figure 3:
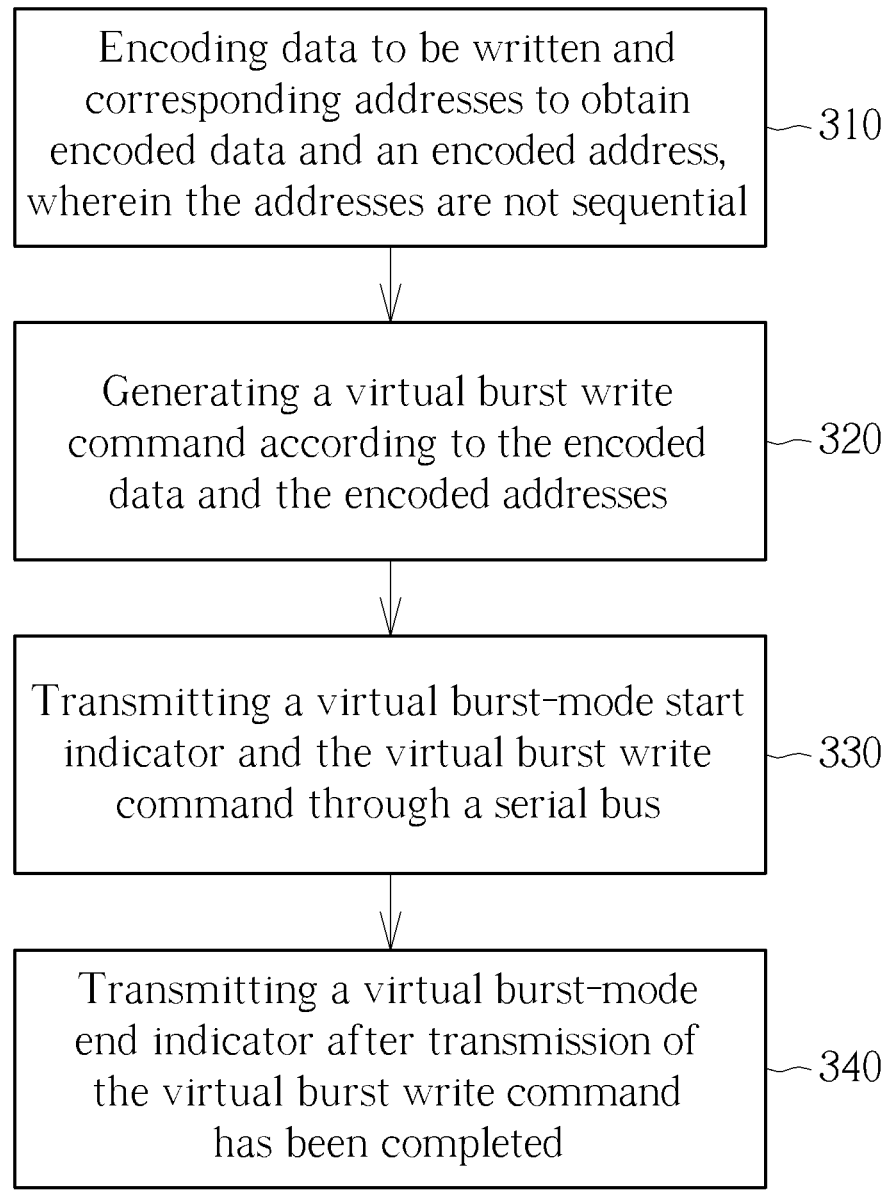
FIG. 3 illustrates a flow regarding how the command transmitter delivers multiple register write command with a virtual burst write command according to one embodiment of the present invention.

In light of above, a flow how the command transmitter 130 delivers multiple register write command with a virtual burst write command is illustrated in FIG. 3, which comprises following steps:

Step 310: encoding data to be written and corresponding addresses to obtain encoded data and an encoded address, wherein the addresses are not sequential;

Step 320: generating a virtual burst write command according to the encoded data and the encoded addresses;

Step 330: transmitting a virtual burst-mode start indicator and the virtual burst write command through a serial bus; and Step 340: transmitting a virtual burst-mode end indicator after transmission of the virtual burst write command has been completed.

On the other hand, the image sensor 200 may comprise a register bank 210, a command receiver 220, a multiplexer 250, a sensor array 260, a memory 270 and an image signal processor 280, where the sensor array 260, the memory 270 and the image signal processor 280 can be used to accomplish image frame/sequence capturing. The command receiver 220 of the image sensor 200 is arranged to receive commands via the serial bus 150. The command receiver 220 comprises a bus slave device 222, a mode checker 224 and a command decoder 226. First, the bus slave device 222 receives commands through the serial bus 150 according to the protocol that the serial bus 150 is compliant with. The mode checker 224 will detect if a received command R_CMD is a virtual burst-mode start/end indicator. If it is found that the virtual burst-mode start indicator is received, the mode checker 224 will set the multiplexer 250 to select a decoded path PA1 to couple to the register bank 210; otherwise, the multiplexer 250 will select a normal path PA2 to couple to the register bank 210. Moreover, if it is found that the virtual burst-mode end indicator is received, the mode checker 211 will set the multiplexer 250 to select the normal path PA2 to couple to the register bank 210 again. In other words, once the virtual burst-mode start indicator is received, the command receiver 220 will treat a following received command R_CMD as a virtual burst write command. On the other hand, if the virtual burst-mode end indicator is received, the command receiver 220 will treat a following received command R_CMD as a normal command.

When the normal path PA2 is coupled to the register bank 210, a resister in the register bank 210 that is identified by the address in the received command will be accessed, to be read or written with the data in the received command. If the decoded path PA1 is coupled to the register bank 210, the set of resisters 212 in the register bank 210 that are identified by decoded address will be written according to decoded data. Specifically, the command decoder 226 in the command receiver 220 will decode the encoded burst-mode address and the encoded data included in the received virtual burst write command. Accordingly, a plurality of register addresses of the set of registers 212 and data required to be written to will be recovered. Through the decoded path PA1, the set of the register 212 will be written accordingly. Thus, the initialization process of the image sensor 200 can be accomplished after all of the set of the register 212 are written according to the decoded addresses and the decoded data.

Figure 4:
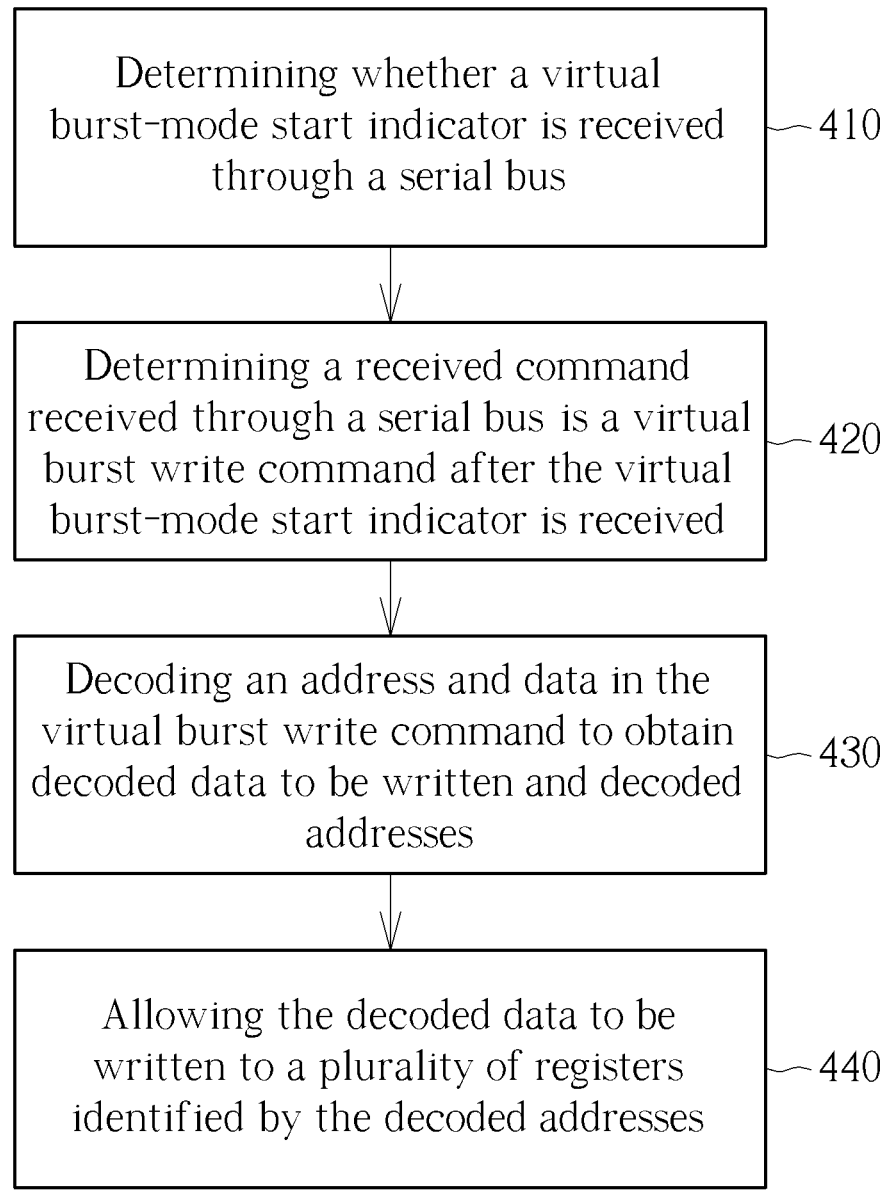
FIG. 4 illustrates a flow regarding how the command receiver handles commands received through the serial bus according to one embodiment of the present invention.

In light of above, a flow regarding how the command receiver 220 handles commands received through the serial bus 150 is illustrated in FIG. 4, which comprises following steps:

Step 410: determining whether a virtual burst-mode start indicator is received through a serial bus;

Step 420: determining a received command received through the serial bus is a virtual burst write command after the virtual burst-mode start indicator is received;

Step 430: decoding an address and data in the virtual burst write command to obtain decoded data to be written and decoded addresses; and Step 440: allowing the decoded data to be written to a plurality of registers identified by the decoded addresses.

Figure 5:
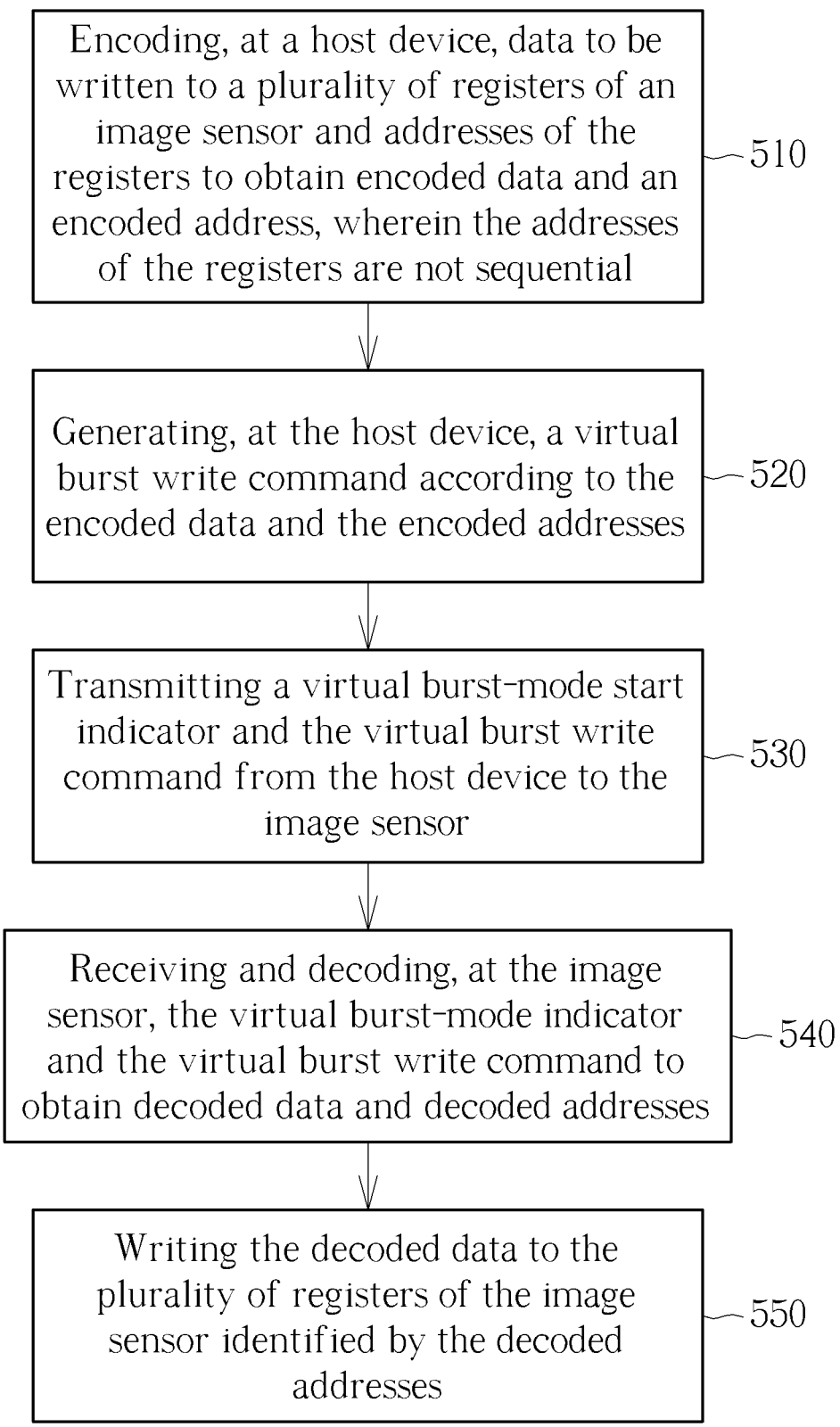
FIG. 5 illustrates a flow chart of a method of initialization an image sensor according to one embodiment of the present invention.

Based on the above-mentioned embodiments, the present invention provides a method of initialization an image sensor, which can be summarized in a flow illustrated in FIG. 5, which comprises following steps:

Step 510: encoding, at a host device, data to be written to a plurality of registers of an image sensor and addresses of the registers to obtain encoded data and an encoded address, wherein the addresses of the registers are not sequential;

Step 520: generating, at the host device, a virtual burst write command according to the encoded data and the encoded addresses;

Step 530: transmitting a virtual burst-mode start indicator and the virtual burst write command from the host device to the image sensor;

Step 540: receiving and decoding, at the image sensor, the virtual burst-mode indicator and the virtual burst write command to obtain decoded data and decoded addresses; and Step 550: writing the decoded data to the plurality of registers of the image sensor identified by the decoded addresses.

Please note that, in the above descriptions, an I²C protocol and an I²C burst writ command format have been taken as certain embodiments. However, this is not a limitation of the present invention. One of ordinary skill in the art should know how to use encoded data and encoded addresses to produce a burst-mode command in other types of serial buses after fully appreciating the concept of the present invention.

In conclusion, the present invention provides methods and apparatus to deliver multiple write commands through burst-mode transmission even when the multiple write commands are not sequential in addresses. Specifically, the present invention uses encoding/decoding techniques to allow write commands that are destined to non-sequential addresses to be incorporated in a "virtual" burst write command. With the burst-mode transactions, the efficiency of the massive amount of bus transactions can be significantly improved. Therefore, the present invention improves the speed of the initialization process of an image sensor or the speed of other types of operations that require a lot of non-sequential write command transmissions.

Embodiments in accordance with the present invention can be implemented as apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for delivering multiple write commands, comprising:
   encoding data to be written and corresponding addresses in the multiple write commands to obtain encoded data and an encoded address, wherein the addresses are not sequential; and information regarding addresses of the multiple write commands is encoded into the encoded data;
   generating a virtual burst write command according to the encoded data and the encoded addresses; and
   transmitting a virtual burst-mode start indicator and the virtual burst write command through a serial bus;
   wherein the virtual burst write command includes a plurality of data fields, and the plurality of data fields carry information regarding encoded address and encoded data; an amount of data in the plurality of data fields is greater than the data to be written in the multiple write commands.

2. The method of claim 1, wherein the serial bus is an I²C bus and the virtual burst-mode start indicator as well as the virtual burst write command are compliant with I²C protocol.

3. The method of claim 1, further comprising:
   transmitting a virtual burst-mode end indicator after transmission of the virtual burst write command has been completed.

4. A command transmitter for delivering multiple write commands, comprising:
   a command encoder, arranged to encode data to be written and corresponding addresses in the multiple write commands to obtain encoded data and an encoded address and generate a virtual burst write command according to the encoded data and the encoded addresses, wherein the addresses are not sequential; and information regarding addresses of the multiple write commands is encoded into the encoded data; and
   a bus master device, coupled to the command encoder, arranged to transmit a virtual burst-mode start indicator and the virtual burst write command through a serial bus;
   wherein the virtual burst write command includes a plurality of data fields, and the plurality of data fields carry information regarding encoded address and encoded data; an amount of data in the plurality of data fields is greater than the data to be written in the multiple write commands.

5. The command transmitter of claim 4, wherein the serial bus is an I²C bus and the virtual burst-mode start indicator as well as the virtual burst write command are compliant with I²C protocol.

6. The command transmitter of claim 4, wherein the bus master device is further arranged to transmit a virtual burst-mode end indicator after transmission of the virtual burst write command has been completed.

7. A method for handling commands received through a serial bus, comprising:
   determining whether a virtual burst-mode start indicator is received through the serial bus;
   determining a received command received through the serial bus is a virtual burst write command after the virtual burst-mode start indicator is received;
   decoding an address and data in the virtual burst write command to obtain decoded data to be written and decoded addresses, wherein data in one or more data fields of the virtual burst write command carries information regarding the decoded addresses;
   allowing the decoded data to be written to a plurality of registers identified by the decoded addresses; and
   selecting the decoded address and the decoded data to conduct writing of the registers or selecting undecoded address and undecoded data to conduct writing of the registers;
   wherein the virtual burst write command includes a plurality of data fields, and the plurality of data fields carry information regarding encoded address and encoded data; an amount of data in the plurality of data fields is greater than the data to be written in the multiple write commands.

8. The method of claim 7, wherein the serial bus is an I$^2$C bus, and the virtual burst-mode start indicator and the virtual burst write command are compliant with I$^2$C protocol.

9. The method of claim 7, further comprising:
   determining whether a virtual burst-mode end indicator is received through the serial bus;
   determining a received command received through the serial bus is a normal command; and
   accessing to a register according to the normal command without decoding an address or data in the normal command.

10. A command receiver for handling commands received through a serial bus, comprising:
    a bus slave device, arranged to receive commands through the serial bus;
    a mode checker, coupled to the bus slave device, and arranged to determine whether a virtual burst-mode start indicator is received through the serial bus and determine a received command received through the serial bus is a virtual burst write command after the virtual burst-mode start indicator is received;
    a command decoder, coupled to the bus slave device, and arranged to decode an address and data in the virtual burst write command to obtain decoded data to be written and decoded addresses, wherein data in one or more data fields of the virtual burst write command carries information regarding the decoded addresses; and
    a multiplexer for selecting the decoded address and the decoded data that is decoded by the command decoder to conduct writing of the registers or selecting undecoded address and undecoded data that is directly proved by the serial bus to to conduct writing of the registers;
    wherein the command receiver allows the decoded data to be written to a plurality of registers identified by the decoded addresses;
    wherein the virtual burst write command includes a plurality of data fields, and the plurality of data fields carry information regarding encoded address and encoded data; an amount of data in the plurality of data fields is greater than the data to be written in the multiple write commands.

11. The command receiver of claim 10, wherein the serial bus is an I$^2$C bus, and the virtual burst-mode start indicator and the virtual burst write command are compliant with I$^2$C protocol.

12. The command receiver of claim 7, wherein the mode checker is further arranged to determine whether a virtual burst-mode end indicator is received through the serial bus and arranged to determine a received command through the serial bus is a normal command; and a register is accessed to according to the normal command without decoding an address or data in the normal command.

13. A method for initializing an image sensor, comprising:
    encoding, at a host device, data to be written to a plurality of registers of an image sensor and addresses of the registers to obtain encoded data and an encoded address, wherein the addresses of the registers are not sequential; and information regarding the addresses of registers is encoded into the encoded data;
    generating, at the host device, a virtual burst write command according to the encoded data and the encoded addresses;
    transmitting a virtual burst-mode start indicator and the virtual burst write command from the host device to the image sensor via a serial bus; wherein the encoded data in one or more data fields of the virtual burst write command carries information regarding the addresses of the plurality of registers;
    receiving and decoding, at the image sensor, the virtual burst-mode indicator and the virtual burst write command to obtain decoded data and decoded addresses;
    selecting the decoded address and the decoded data that to conduct writing of the registers or selecting undecoded address and undecoded data to conduct writing of the registers; and
    writing the decoded data to the plurality of registers of the image sensor identified by the decoded addresses;
    wherein the virtual burst write command includes a plurality of data fields, and the plurality of data fields carry information regarding encoded address and encoded data; an amount of data in the plurality of data fields is greater than the data to be written in the multiple write commands.

14. An electronic device, comprising:
    a host device, comprising:
       a command encoder, arranged to encode data to be written to a plurality of registers of an image sensor and addresses of the registers to obtain encoded data and an encoded address, wherein the addresses of the registers are not sequential; information regarding the addresses of registers is encoded into the encoded data; and the command encoder is arranged to generate a virtual burst write command according to the encoded data and the encoded addresses; and
       a bus master device, coupled to the command encoder, arranged to transmit a virtual burst-mode start indicator and the virtual burst write command from the host device to the image sensor via a serial bus; wherein the encoded data in one or more data fields of the virtual burst write command carries information regarding the addresses of the plurality of registers; and the image sensor, comprising:
- a bus slave device, coupled to the serial bus, arranged to receive the virtual burst-mode indicator and the virtual burst write command; and
- a command decoder, coupled to the bus slave device, arranged to decode the virtual burst write command to obtain decoded data and decoded addresses; and
- a multiplexer for selecting the decoded address and the decoded data that is decoded by the command decoder to conduct writing of the registers or selecting undecoded address and undecoded data that is directly proved by the serial bus to conduct writing of the registers;
- wherein the plurality of registers of the image sensor identified by the decoded addresses are written according to the decoded data;
- wherein the virtual burst write command includes a plurality of data fields, and the plurality of data fields carry information regarding encoded address and encoded data; an amount of data in the plurality of data fields is greater than the data to be written in the multiple write commands.

* * * * *